United States Patent
Zhang et al.

(10) Patent No.: US 12,452,758 B2
(45) Date of Patent: Oct. 21, 2025

(54) RECOVERY FROM RADIO LINK FAILURE

(71) Applicant: QUALCOMM Incorporated, San Diego, CA (US)

(72) Inventors: Fojian Zhang, Shenzhen (CN); Hao Zhang, Shanghai (CN); Jian Li, Shanghai (CN); Yuankun Zhu, Shanghai (CN); Chaofeng Hui, Beijing (CN); Haojun Wang, Shaanxi (CN); Guojing Liu, Beijing (CN); Yi Liu, Shenzhen (CN); Tianya Lin, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/996,487

(22) PCT Filed: Jun. 5, 2020

(86) PCT No.: PCT/CN2020/094594
§ 371 (c)(1),
(2) Date: Oct. 18, 2022

(87) PCT Pub. No.: WO2021/243689
PCT Pub. Date: Dec. 9, 2021

(65) Prior Publication Data
US 2023/0209434 A1 Jun. 29, 2023

(51) Int. Cl.
*H04W 36/30* (2009.01)
*H04W 36/00* (2009.01)

(52) U.S. Cl.
CPC ..... *H04W 36/305* (2018.08); *H04W 36/0058* (2018.08); *H04W 36/0085* (2018.08)

(58) Field of Classification Search
CPC .......... H04W 36/305; H04W 36/0058; H04W 36/0085; H04W 36/0079; H04W 76/19
(Continued)

(56) References Cited

U.S. PATENT DOCUMENTS

2010/0311349 A1* 12/2010 Koo ............ H04W 16/02
455/67.11
2011/0151919 A1* 6/2011 Shin ............ H04W 24/00
455/67.11
(Continued)

FOREIGN PATENT DOCUMENTS

| CN | 102869025 A | 1/2013 |
| CN | 105493551 A | 4/2016 |
| WO | WO-2014015496 A1 | 1/2014 |

OTHER PUBLICATIONS

International Search Report and Written Opinion—PCT/CN2020/094594—ISA/EPO—Mar. 3, 2021.

*Primary Examiner* — Mang Hang Yeung
(74) *Attorney, Agent, or Firm* — Harrity & Harrity, LLP (57) ABSTRACT

Various aspects of the present disclosure generally relate to wireless communication. In some aspects, a user equipment (UE) may determine that a signal-to-noise ratio (SNR) of one or more communications from a serving cell satisfies an SNR threshold after establishing a New Radio radio resource control (RRC) connection with the serving cell. The UE may transmit a measurement message to the cell based at least in part, on the determining that the SNR of the one or more communications from the serving cell satisfies the SNR threshold. The UE may receive, from the serving cell, a list of one or more neighbor cells based at least in part on the transmitting the measurement message, and establish an RRC connection to a neighbor cell on the list based at least in part on determining that a radio link failure occurred. Numerous other aspects are provided.

25 Claims, 5 Drawing Sheets

(58) Field of Classification Search
USPC .......................................................... 370/216
See application file for complete search history.

(56) References Cited

U.S. PATENT DOCUMENTS

| 2012/0149429 A1* | 6/2012 | Martin ............ H04W 36/00835 |
| | | 455/525 |
| 2016/0174091 A1 | 6/2016 | Zhang et al. |
| 2017/0150410 A1 | 5/2017 | Yang et al. |

* cited by examiner

RECOVERY FROM RADIO LINK FAILURE

CROSS-REFERENCE TO RELATED APPLICATION

This application is a 35 U.S.C. § 371 U.S. national stage entry of International Application PCT/CN2020/094594, having an international filing date of Jun. 5, 2020, entitled "RECOVERY FROM RADIO LINK FAILURE," which is hereby expressly incorporated by reference herein.

FIELD OF THE DISCLOSURE

Aspects of the present disclosure generally relate to wireless communication and to techniques and apparatuses for recovering from a radio link failure.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining that a signal-to-noise ratio (SNR) of one or more communications from a serving cell satisfies an SNR threshold after establishing a New Radio (NR) radio resource control (RRC) connection with the serving cell, and transmitting a measurement message to the cell based at least in part on the determining that the SNR of the one or more communications from the serving cell satisfies the SNR threshold. The method may include receiving, from the serving cell, a list of one or more neighbor cells based at least in part on the transmitting the measurement message, and establishing an RRC connection to a neighbor cell on the list based at least in part on determining that a radio link failure occurred.

In some aspects, a UE for wireless communication may include memory and one or more processors coupled to the memory. For example, the one or more processors may be operatively, electronically, communicatively, or otherwise coupled to the memory. The memory may include instructions executable by the one or more processors to cause the UE to determine that an SNR of one or more communications from a serving cell satisfies an SNR threshold after establishing an NR RRC connection with the serving cell, and transmit a measurement message to the cell based at least in part on the determining that the SNR of the one or more communications from the serving cell satisfies the SNR threshold. The memory may include instructions executable by the one or more processors to cause the UE to receive, from the serving cell, a list of one or more neighbor cells based at least in part on the transmitting the measurement message, and establish an RRC connection to a neighbor cell on the list based at least in part on determining that a radio link failure occurred.

In some aspects, an apparatus for wireless communication may include means for determining that an SNR of one or more communications from a serving cell satisfies an SNR threshold after establishing an NR RRC connection with the serving cell, means for transmitting a measurement message to the cell based at least in part on the determining that the SNR of the one or more communications from the serving cell satisfies the SNR threshold, means for receiving, from the serving cell, a list of one or more neighbor cells based at least in part on the transmitting the measurement message, and means for establishing an RRC connection to a neighbor cell on the list based at least in part on determining that a radio link failure occurred.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
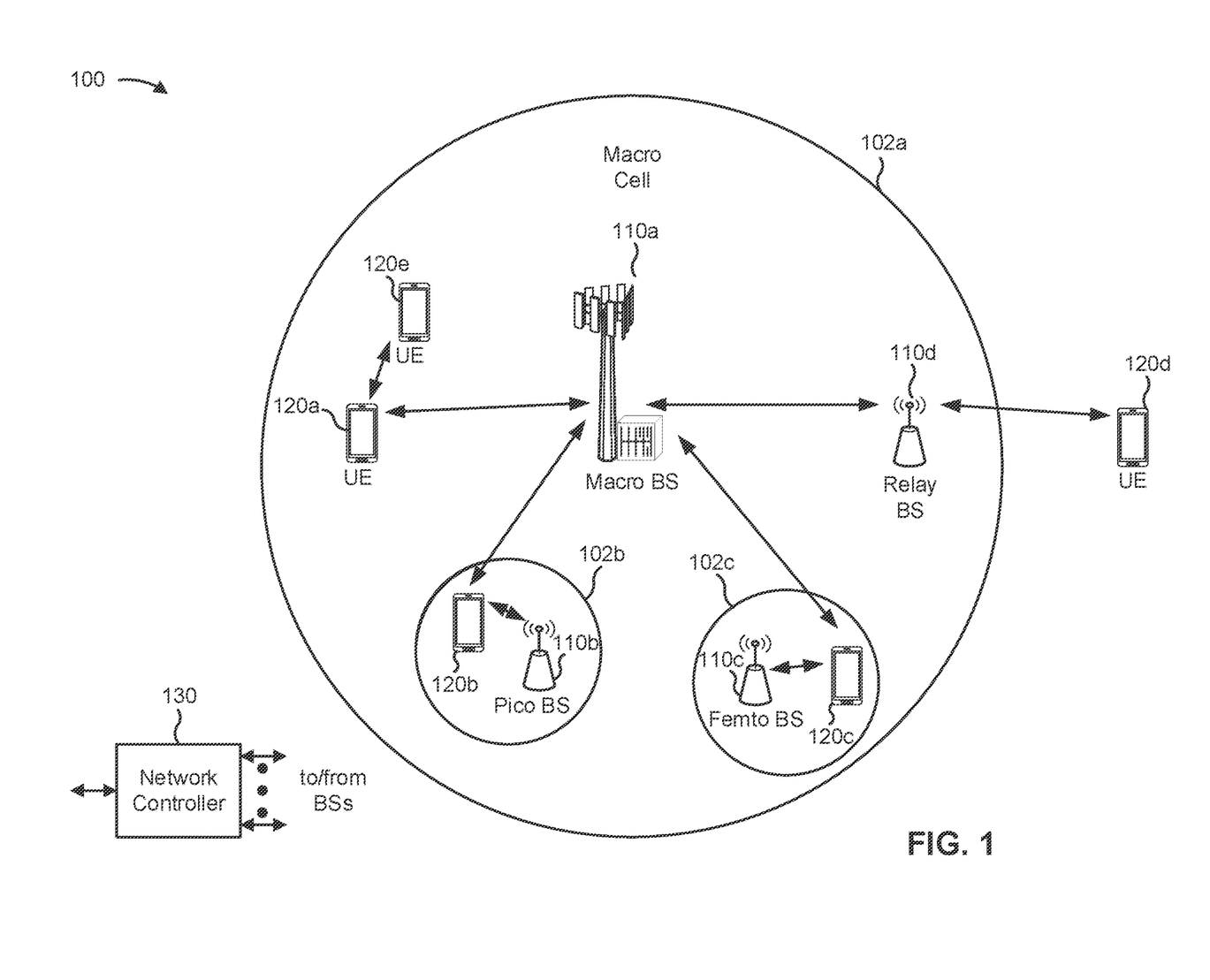
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
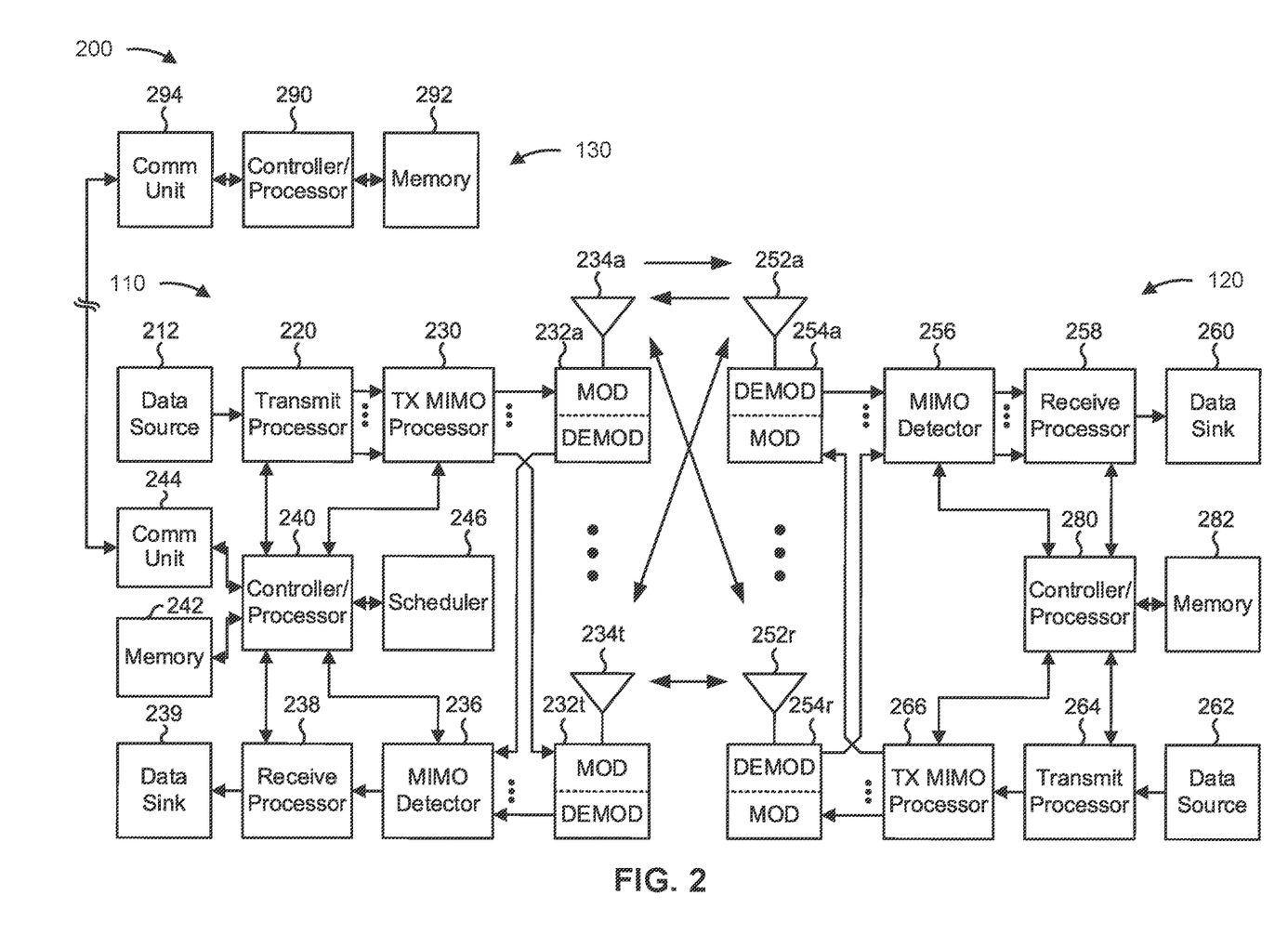
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with recovering from a radio link failure (RLF), as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 500 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining that a signal-to-noise ratio (SNR) of one or more communications from a serving cell satisfies an SNR threshold after establishing an NR radio resource control (RRC) connection with the serving cell, means for transmitting a measurement message to the cell based at least in part on the determining that the SNR of the one or more communications from the serving cell satisfies the SNR threshold, means for receiving, from the serving cell, a list of one or more neighbor cells based at least in part on the transmitting the measurement message, means for establishing an RRC connection to a neighbor cell on the list based at least in part on determining that a radio link failure occurred, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A UE may register with and be connected to an NR 5G cell that provides an NR data service. This may include establishing an RRC connection with the NR 5G cell and transmitting a registration request for the NR data service. When a reference signal received power (RSRP) value of the NR 5G cell is lower than a threshold value, an Event A2 measurement report is output. The UE may transmit the Event A2 measurement report and cause a reselection if the RSRP becomes too low.

In some cases, the RRC connection may be unstable due to interfering signals. For example, an SNR may be too low and the UE may not be able to decode the downlink channel, and thus an RLF may result. However, if the SNR is too low and the RSRP is not low enough to trigger reselection, the UE stays with the NR 5G cell and RLFs continually occur. As a result, the UE loses data service and wastes power, processing resources, and signaling resources.

Figure 3:
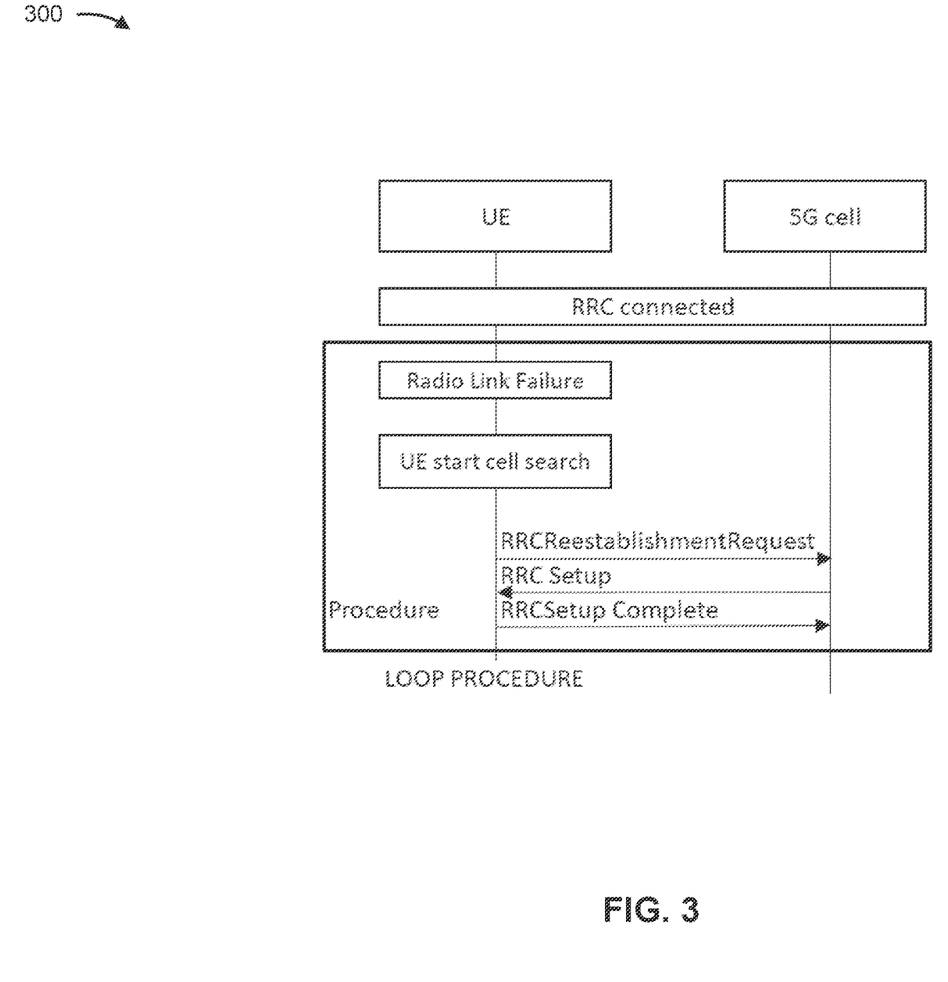
FIG. 3 is a diagram illustrating an example of recovering from a radio link failure (RLF), in accordance with various aspects of the present disclosure.

FIG. 3 is a diagram illustrating an example 300 of a method of recovering from an RLF, in accordance with various aspects of the present disclosure. FIG. 3 shows a signaling diagram for a UE registered with an NR 5G cell. The UE may be in an RRC connected mode. If an RLF occurs, the UE may start a cell search and transmit an RRC reestablishment request to the NR SG cell. This procedure may repeat in a loop. This is a current scenario.

As indicated above, FIG. 3 is provided as an example. Other examples may differ from what is described with regard to FIG. 3.

According to some aspects, the UE may obtain a neighbor cell list when an SNR threshold drops below an SNR threshold. If an RLF occurs, the UE may search the list for a neighbor cell and reselect to the neighbor cell. As a result, the UE may quickly and efficiently reselect to another neighbor cell if an RLF occurs dues to a low SNR but not a low RSRP. The UE recovers from the RLF and saves time, power, processing resources, and signaling resources by not repeatedly experiencing RLFs.

For example, when a UE is in 5G connected mode with a network, the UE may send a measurement report with Event A2, which may trigger the network to configure a 5G/4G neighbor cell list and transmit the neighbor cell list to the UE. The UE may store the neighbor cell list, which may be used for determining candidate neighbor cells for reselection. When RLF occurs, the UE may search the neighbor cell list directly and then obtain data service as soon as possible.

Figure 4:
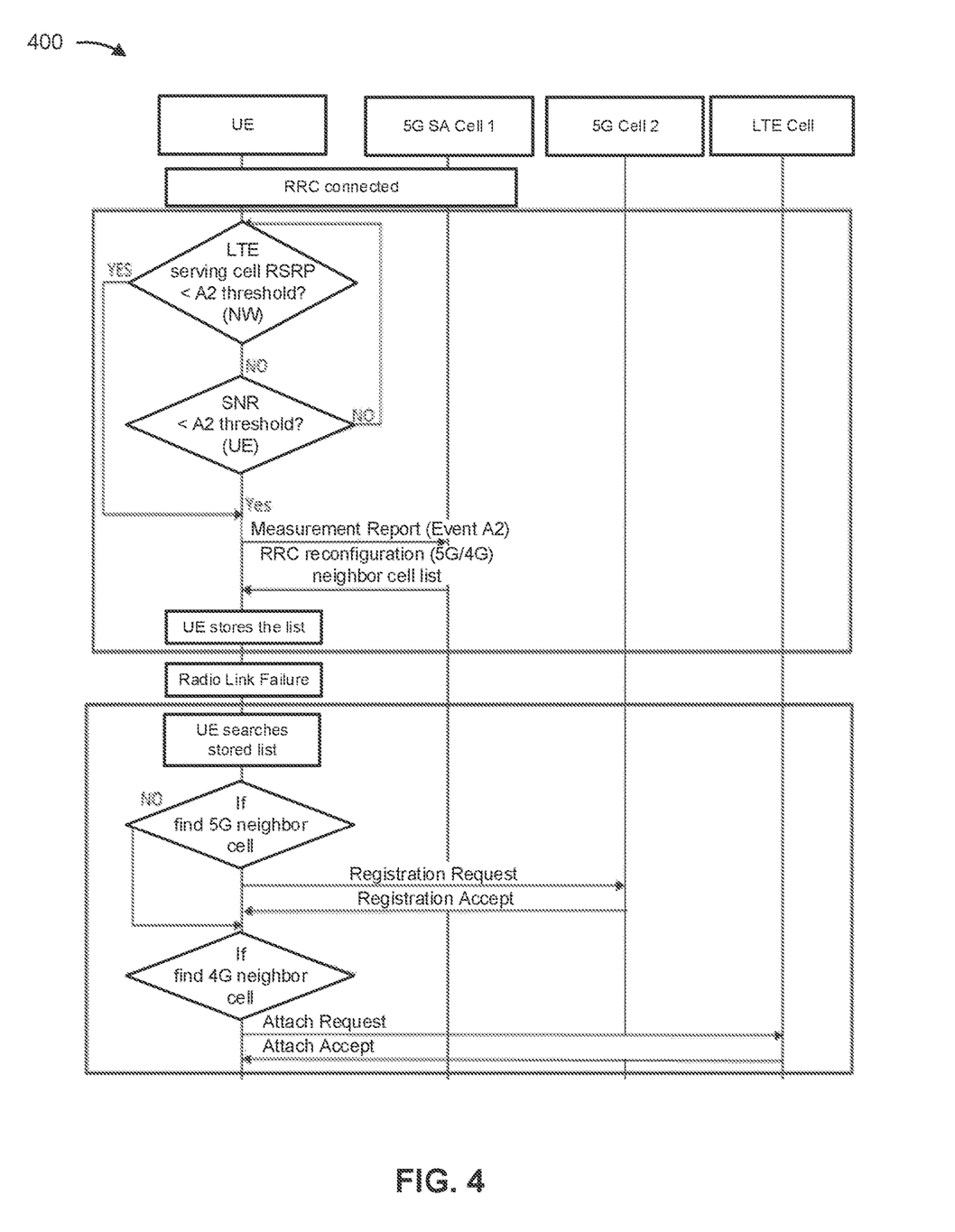
FIG. 4 is a diagram illustrating an example of recovering from an RLF, in accordance with various aspects of the present disclosure.

FIG. 4 is a diagram illustrating an example 400 of a method of recovering from an RLF, in accordance with various aspects of the present disclosure. FIG. 4 shows a signaling diagram for a UE (e.g., a UE 120 depicted in FIGS. 1 and 2, the UE depicted in FIG. 3, and/or the like) that is registered with an NR 5G cell.

In some aspects, the UE may set an SNR threshold to a particular value. The SNR threshold may be, for example, 3 decibels. The UE may connect to a 5G cell (shown as 5G standalone (SA) cell 1 in FIG. 4). The UE may check Condition 1: RSRP<A2_threshold (e.g., −110 decibel-milliwatts) or Condition 2: if SNR<SNR threshold. If condition 1 or 2 is met, the UE may send an EVENT A2 measurement report, and the network may send a 5G neighbor cell list to the UE. The UE may store the neighbor cell list. When an RLF occurs, the UE may search the neighbor cell list directly. For example, as shown in FIG. 4, if the UE finds another SG cell in the neighbor cell list (e.g., 5G cell 2 shown in FIG. 4), the UE may transmit a registration request to the 5G cell. If the UE finds a 4G cell (e.g., LTE cell shown in FIG. 4) in the neighbor cell list, the UE may transmit an attach request to the 4G cell.

As indicated above, FIG. 4 is provided as an example. Other examples may differ from what is described with regard to FIG. 4.

Figure 5:
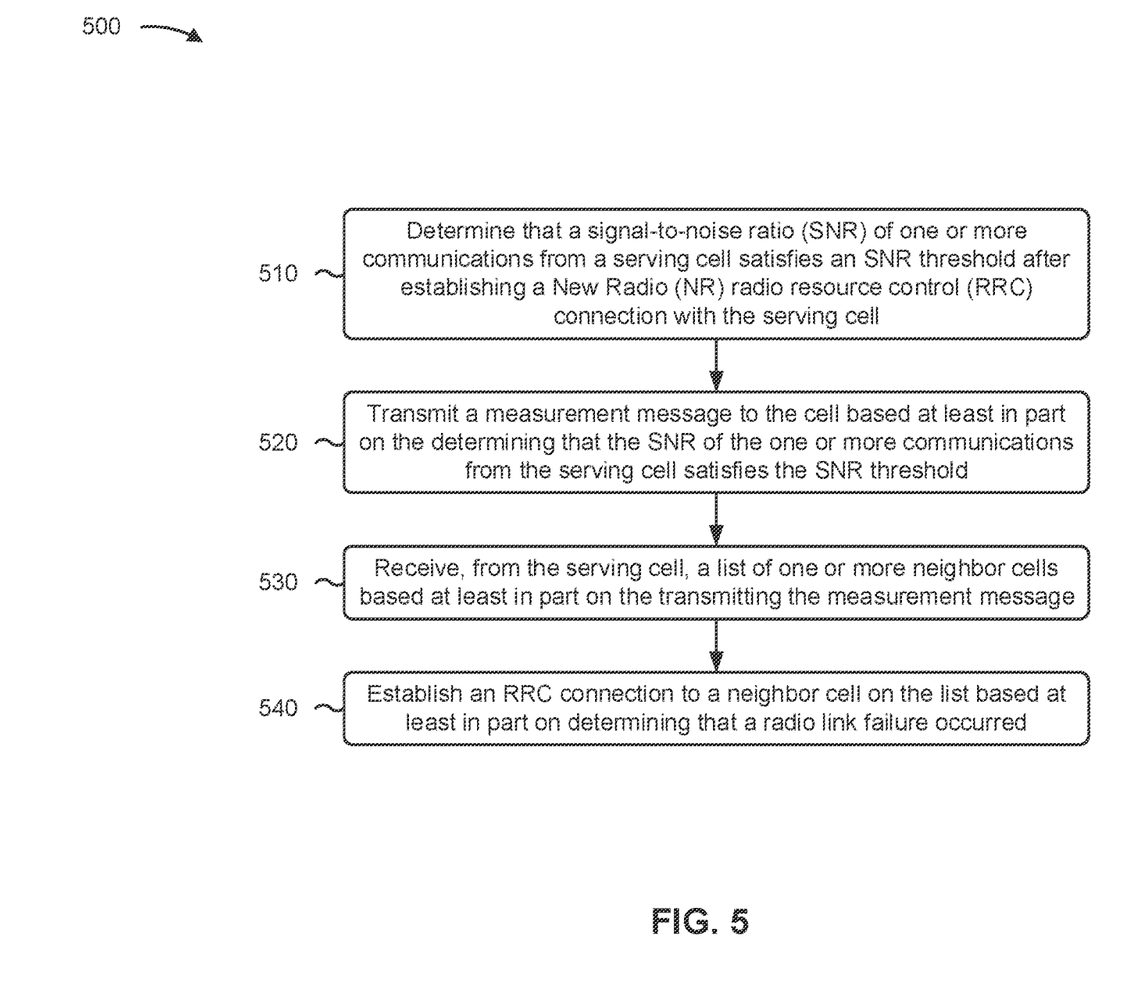
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where the UE (e.g., a UE 120 depicted in FIGS. 1 and 2, the UE depicted in FIGS. 3 and 4, and/or the like) performs operations associated with recovering from an RLF.

As shown in FIG. 5, in some aspects, process 500 may include determining that an SNR of one or more communications from a serving cell satisfies an SNR threshold after establishing an NR RRC connection with the serving cell (block 510). For example, the UE (e.g., using receive processor 258, transmit processor 264, controller/processor 280, memory 282, and/or the like) may determine that an SNR of one or more communications from a serving cell satisfies an SNR threshold, after establishing an NR RRC connection with the serving cell, as described above.

As further shown in FIG. 5, in some aspects, process 500 may include transmitting a measurement message to the cell based at least in part on the determining that the SNR of the one or more communications from the serving cell satisfies the SNR threshold (block 520). For example, the UE (e.g., using receive processor 258, transmit processor 264, controller/processor 280, memory 282, and/or the like) may transmit a measurement message to the cell based at least in part on the determining that the SNR of the one or more communications from the serving cell satisfies the SNR threshold, as described above.

As further shown in FIG. 5, in some aspects, process 500 may include receiving, from the serving cell, a list of one or more neighbor cells based at least in part on the transmitting the measurement message (block 530). For example, the UE (e.g., using receive processor 258, transmit processor 264, controller/processor 280, memory 282, and/or the like) may receive, from the serving cell, a list of one or more neighbor cells based at least in part on the transmitting the measurement message, as described above.

As further shown in FIG. 5, in some aspects, process 500 may include establishing an RRC connection to a neighbor cell on the list based at least in part on determining that a radio link failure occurred (block 540). For example, the UE (e.g., using receive processor 258, transmit processor 264, controller/processor 280, memory 282, and/or the like) may establish an RRC connection to a neighbor cell on the list based at least in part on determining that a radio link failure occurred, as described above.

Process 500 may include additional aspects, such as any single aspect or any combination of aspects described below and/or in connection with one or more other processes described elsewhere herein.

In a first aspect, the measurement message is a measurement report with Event A2.

In a second aspect, alone or in combination with the first aspect, an RSRP for the one or more communications does not satisfy an RSRP threshold for sending the measurement report with Event A2.

In a third aspect, alone or in combination with one or more of the first and second aspects, establishing the RRC connection to the neighbor cell on the list includes searching the list for the neighbor cell.

In a fourth aspect, alone or in combination with one or more of the first through third aspects, the list includes a plurality of LTE cells, a plurality of NR 5G cells, or a combination thereof.

In a fifth aspect, alone or in combination with one or more of the first through fourth aspects, establishing the RRC connection to the neighbor cell on the list includes transmitting one of a registration request or an attach request to the neighbor cell.

In a sixth aspect, alone or in combination with one or more of the first through fifth aspects, process 500 includes configuring the SNR threshold to be 3 decibels or greater.

In a seventh aspect, alone or in combination with one or more of the first through sixth aspects, process 500 includes configuring the SNR threshold based at least in part on one or more of channel conditions, a history of channel conditions, a history of reference signal received power of the one or more communications, a history of transmitted measurement messages, or a combination thereof.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, software, and/or a combination of hardware and software. As used herein, a processor is implemented in hardware, software, and/or a combination of hardware and software. Software is to be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, software, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining that a signal-to-noise ratio (SNR) of one or more communications from a serving cell satisfies an SNR threshold after establishing a New Radio (NR) radio resource control (RRC) connection with the serving cell;
    transmitting a measurement message to the serving cell based at least in part on the determining that the SNR of the one or more communications from the serving cell satisfies the SNR threshold;
    receiving, from the serving cell, a list of one or more neighbor cells based at least in part on the transmitting the measurement message; and
    establishing an RRC connection to a neighbor cell on the list based at least in part on determining that a radio link failure occurred.

2. The method of claim 1, wherein the measurement message is a measurement report with Event A2.

3. The method of claim 2, wherein a reference signal received power (RSRP) for the one or more communications does not satisfy an RSRP threshold for sending the measurement report with Event A2.

4. The method of claim 1, wherein establishing the RRC connection to the neighbor cell on the list includes searching the list for the neighbor cell.

5. The method of claim 1, wherein the list includes a plurality of Long Term Evolution cells, a plurality of NR 5G cells, or a combination thereof.

6. The method of claim 1, wherein establishing the RRC connection to the neighbor cell on the list includes transmitting one of a registration request or an attach request to the neighbor cell.

7. The method of claim 1, further comprising configuring the SNR threshold to be 3 decibels or greater.

8. The method of claim 1, further comprising configuring the SNR threshold based at least in part on one or more of channel conditions, a history of channel conditions, a history of reference signal received power of the one or more communications, a history of transmitted measurement messages, or a combination thereof.

9. A non-transitory computer-readable medium storing one or more instructions for wireless communication, the one or more instructions, when executed by one or more processors of a user equipment (UE), cause the UE to:
    determine that a signal-to-noise ratio (SNR) of one or more communications from a serving cell satisfies an SNR threshold after establishing a New Radio radio resource control (RRC) connection with the serving cell;
    transmit a measurement message to the serving cell based at least in part on the determining that the SNR of the one or more communications from the serving cell satisfies the SNR threshold;
    receive, from the serving cell, a list of one or more neighbor cells based at least in part on the transmitting the measurement message; and
    establish an RRC connection to a neighbor cell on the list based at least in part on determining that a radio link failure occurred.

10. A user equipment (UE) for wireless communication, comprising:
    a memory; and
    one or more processors coupled to the memory, the memory including instructions executable by the one or more processors to cause the UE to:
        determine that a signal-to-noise ratio (SNR) of one or more communications from a serving cell satisfies an SNR threshold after establishing a New Radio radio resource control (RRC) connection with the serving cell;
        transmit a measurement message to the serving cell based at least in part on the determining that the SNR of the one or more communications from the serving cell satisfies the SNR threshold;
        receive, from the serving cell, a list of one or more neighbor cells based at least in part on the transmitting the measurement message; and
        establish an RRC connection to a neighbor cell on the list based at least in part on determining that a radio link failure occurred.

11. The UE of claim 10, wherein the measurement message is a measurement report with Event A2.

12. The UE of claim 11, wherein a reference signal received power (RSRP) for the one or more communications does not satisfy an RSRP threshold for sending the measurement report with Event A2.

13. The UE of claim 10, wherein the memory includes instructions executable by the one or more processors to cause the UE to, when establishing the RRC connection to the neighbor cell on the list, search the list for the neighbor cell.

14. The UE of claim 10, wherein the list includes a plurality of Long Term Evolution cells, a plurality of NR 5G cells, or a combination thereof.

15. The UE of claim 10, wherein the memory includes instructions executable by the one or more processors to cause the UE to, when establishing the RRC connection to the neighbor cell on the list, transmit one of a registration request or an attach request to the neighbor cell.

16. The UE of claim 10, wherein the memory further includes instructions executable by the one or more processors to cause the UE to configure the SNR threshold to be 3 decibels or greater.

17. The UE of claim 10, wherein the memory further includes instructions executable by the one or more processors to cause the UE to configure the SNR threshold based at least in part on one or more of channel conditions, a history of channel conditions, a history of reference signal received power of the one or more communications, a history of transmitted measurement messages, or a combination thereof.

18. An apparatus for wireless communication, comprising:
    means for determining that a signal-to-noise ratio (SNR) of one or more communications from a serving cell satisfies an SNR threshold after establishing a New Radio radio resource control (RRC) connection with the serving cell;
    means for transmitting a measurement message to the serving cell based at least in part on the determining that the SNR of the one or more communications from the serving cell satisfies the SNR threshold;
    means for receiving, from the serving cell, a list of one or more neighbor cells based at least in part on the transmitting the measurement message; and
    means for establishing an RRC connection to a neighbor cell on the list based at least in part on determining that a radio link failure occurred.

19. The apparatus of claim 18, wherein the measurement message is a measurement report with Event A2.

20. The apparatus of claim 19, wherein a reference signal received power (RSRP) for the one or more communications does not satisfy an RSRP threshold for sending the measurement report with Event A2.

21. The apparatus of claim 18, wherein the means for establishing the RRC connection to the neighbor cell on the list includes means for searching the list for the neighbor cell.

22. The apparatus of claim 18, wherein the list includes a plurality of Long Term Evolution cells, a plurality of NR 5G cells, or a combination thereof.

23. The apparatus of claim 18, wherein the means for establishing the RRC connection to the neighbor cell on the list includes means for transmitting one of a registration request or an attach request to the neighbor cell.

24. The apparatus of claim 18, further comprising means for configuring the SNR threshold to be 3 decibels or greater.

25. The apparatus of claim 18, further comprising means for configuring the SNR threshold based at least in part on one or more of channel conditions, a history of channel conditions, a history of reference signal received power of the one or more communications, a history of transmitted measurement messages, or a combination thereof.

* * * * *